(12) United States Patent
Goussard et al.

(10) Patent No.: US 9,666,185 B2
(45) Date of Patent: May 30, 2017

(54) AUTOMATIC DATA-DRIVEN DIALOG DISCOVERY SYSTEM

(71) Applicant: Nuance Communications, Inc., Burlington, MA (US)

(72) Inventors: Jacques-Olivier Goussard, Greenfield Park (CA); Richard J. Beaufort, Corbais (BE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/506,873

(22) Filed: Oct. 6, 2014

(65) Prior Publication Data

US 2016/0098988 A1    Apr. 7, 2016

(51) Int. Cl.
| | | |
|---|---|---|
| *G10L 15/08* | (2006.01) | |
| *G10L 15/18* | (2013.01) | |
| *H04M 3/493* | (2006.01) | |
| *G10L 15/22* | (2006.01) | |

(52) U.S. Cl.
CPC .......... *G10L 15/18* (2013.01); *G10L 15/1822* (2013.01); *H04M 3/4936* (2013.01); *G10L 2015/225* (2013.01); *H04M 2203/355* (2013.01)

(58) Field of Classification Search
CPC .... H04M 3/493; H04M 3/533; H04M 3/4938; H04M 2201/40; H04M 3/5175; H04M 2203/355; H04M 3/4936; H04M 3/5166; H04N 21/482; H04N 5/44543; H04N 21/4622; G06Q 30/02; G06Q 30/0269; G06Q 10/02; G06F 3/0482

USPC .......... 704/1–10, 219, 257, 270.1, E15.044, 704/E15.04, E15.001, E15.018, E19.043; 715/810, 825

See application file for complete search history.

(56) References Cited

U.S. PATENT DOCUMENTS

| | | | |
|---|---|---|---|
| 6,356,869 B1 | 3/2002 | Chapados et al. | |
| 2003/0097249 A1 | 5/2003 | Walker et al. | |
| 2004/0196211 A1* | 10/2004 | Keuthe | G09F 27/00 345/1.1 |
| 2007/0077919 A1* | 4/2007 | Chiarulli | H04W 4/10 455/414.1 |
| 2011/0276642 A1* | 11/2011 | Gioev | G09B 5/00 709/206 |

OTHER PUBLICATIONS

Burnett, Daniel C., "SpeechObjects Specification V1.0" W3C Note Nov. 14, 2000.

(Continued)

*Primary Examiner* — Marivelisse Santiago Cordero
*Assistant Examiner* — Stephen Brinich
(74) *Attorney, Agent, or Firm* — Banner & Witcoff, Ltd.

(57) ABSTRACT

Methods and systems for providing help prompts to a user of an automated dialog system are presented. In some embodiments, a computing device may receive a help request from the user of an automated dialog system. The help request may comprise a user request for information about one or more capabilities of the automated dialog system. The computing device may identify information expected to be input by the user to request that the automated dialog system perform its one or more capabilities. A natural language help prompt may be generated to provide guidance to the user to provide the identified information expected to be input.

18 Claims, 7 Drawing Sheets

(56) References Cited

OTHER PUBLICATIONS

Hardy, Hilda, et al., Data-Driven Strategies for an Automated Dialogue System; 42nd Annual Meeting of the Association for Computational Linguistics; ACL-04, Jul. 2004.

Feb. 17, 2016—(EP) International Search Report and Written Opinion—App No. PCT/US2015/051929.

* cited by examiner

AUTOMATIC DATA-DRIVEN DIALOG DISCOVERY SYSTEM

FIELD

Aspects described herein relate to natural language understanding. More specifically, aspects described herein relate to natural language automated dialog systems that provide natural language help prompts to the user.

BACKGROUND

With advances in natural language processing (NLP), there is an increasing demand to improve automated dialog systems to perform user tasks. A shortcoming of conventional automated dialog systems is the assumption that the user has knowledge of the dialog system's capacities before interacting with the dialog system. Conventional dialog systems assume that their users are aware of the potential different methods of inputting speech information. However, the users might not know about the functionalities of the automated dialog system or how to properly trigger these functionalities.

Conventional dialog systems use hardcoded help prompts to provide the user with help information. However, such help information does not incorporate the dialog and therefore does not follow the flow of the conversation. Accordingly, such help information does not adapt to the previously collected information in the dialog. Therefore, the hardcoded help prompts in conventional dialog systems are typically much too context agnostic. Such hardcoded help information may guide users to phrase their input in a format that is not well supported by the natural language understanding (NLU) of the dialog system, resulting in problems handling the received user speech input by the dialog system.

Because conventional dialog systems use hardcoded help prompts, such systems also fail to update their help prompts with updated data over time. As a dialog application evolves, with the addition of new data or new user information, the dialog system may require different information from the user. The user is often unaware of the evolving capabilities of the dialog system. Hardcoded help prompts do not allow the user to receive help prompts that provide the most updated help data mirroring the current state of the dialog system. Accordingly, current dialog systems fail to provide context aware help prompts that track the dialog and provide updated help information to the user reflecting the current state of the dialog system.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Various aspects of the disclosure provide more efficient, effective, functional, and convenient ways of providing automated and customized help prompts to the user of an automated dialog system. In particular, in one or more embodiments discussed in greater detail below, help prompt functionalities based on the dialog state of the automated dialog system are implemented, and/or used in a number of different ways to provide one or more of these and/or other advantages.

In some embodiments, a computing device may receive a help request from a user of an automated dialog system. The help request may include a user request for information about one or more capabilities of the automated dialog system. The computing device may identify information expected to be input by the user to request that the automated dialog system perform the one or more capabilities. Such information may be identified based on a state of the automated dialog system. The computing device may generate a natural language help prompt providing guidance to the user to provide the identified information expected to be input.

In some embodiments, the natural language help prompt may be generated by querying natural language training data to obtain a natural language phrase for the natural language help prompt. The natural language training data may be used to generate the natural language help prompt by identifying a plurality of natural language samples from the natural language training data. Each natural language sample may include at least one mention corresponding to the identified information expected to be input. The computing device may select natural language sample from the plurality of natural language samples which has the highest frequency of usage in the natural language training data.

In some embodiments, the identified information expected to be input may be identified by identifying components of the automated dialog system that require identified information expected to be input from the user to execute and by determining the identified information expected to be input that the components require to progress to a next state of the automated dialog system.

In some embodiments, the identified information expected to be input may be identified by identifying the state of the automated dialog system and determining the information expected by the automated dialog system corresponding to the state from a mapping between states of the automated dialog system and information expected by the automated dialog system at each dialog state.

In some embodiments, the natural language help prompt may be generated by identifying a natural language phrase corresponding to the identified information expected to be input from a mapping between information expected to be input and natural language phrases that the automated dialog system expects to receive from the user. The natural language help prompt may comprise information from a data source remote to the automated dialog system.

In some embodiments, the identified information expected to be input that has not yet been received may be updated as additional information is received by the automated dialog system.

In some embodiments, the identified information expected to be input that has not yet been received is updated as the state of the automated dialog system is updated.

In some embodiments, the natural language help prompt may be dynamically updated as a function of an updated dialog state of the automated dialog system.

In some embodiments, the computing device may receive a first user help request for information about one or more capabilities of the automated dialog system. The computing device may identify first information required by the automated dialog system to perform the one or more capabilities. The first information may be identified based on a first state of the automated dialog system. The computing device may generate a first help prompt comprising instructions for entering the first information. The first help prompt may include information from data available to the automated dialog system. Upon receiving a second user help request after the first information has been received by the automated dialog system, the computing device may identify that the data has been updated. The computing device may generate a second help prompt that is different from the first help prompt. The second help prompt may be generated to include a natural language phrase based on the updated data.

In some embodiments, the second help prompt may be generated upon identifying that the automated dialog system is in the first state.

In some embodiments, the second help prompt may include instructions for entering second information expected to be input by the automated dialog system to perform the one or more capabilities. The second help prompt may include the natural language phrase based on the updated data to guide the user to enter the second information.

In some embodiments, the second help prompt may incorporate the first information received from the user to identify second information that the automated dialog system has not yet received.

In some embodiments, the computing device may receive a first user help request for information about one or more capabilities of an automated dialog system. The computing device may identify first information required by the automated dialog system to perform the one or more capabilities. The first information may be identified based on a first state of the automated dialog system. The computing device may generate a first help prompt comprising instructions for entering the first information. Upon receiving a second user help request after the first information has been received by the automated dialog system, the computing device may identify second information required by the automated dialog system to perform the one or more capabilities. The second information may be identified based on a second state of the automated dialog system. The computing device may generate a second help prompt that is different from the first help prompt which includes instructions for entering the second information.

In some embodiments, the second information may be identified upon determining that a state of the automated dialog system has been updated to a second state between a time when the first user request is received and a time when the second user help request is received.

In some embodiments, the second help prompt may incorporate the first information by the automated dialog system to identify the second information that the automated dialog system has not yet received.

In some embodiments, the second information may be identified by identifying that a state of the automated dialog system has been updated to the second state when the second user help request is received and by determining information expected by the automated dialog system corresponding to the second state from a mapping between states of the automated dialog system and information expected by the automated dialog system at each state.

These and additional aspects will be appreciated with the benefit of the disclosures discussed in further detail below.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

Figure 1:
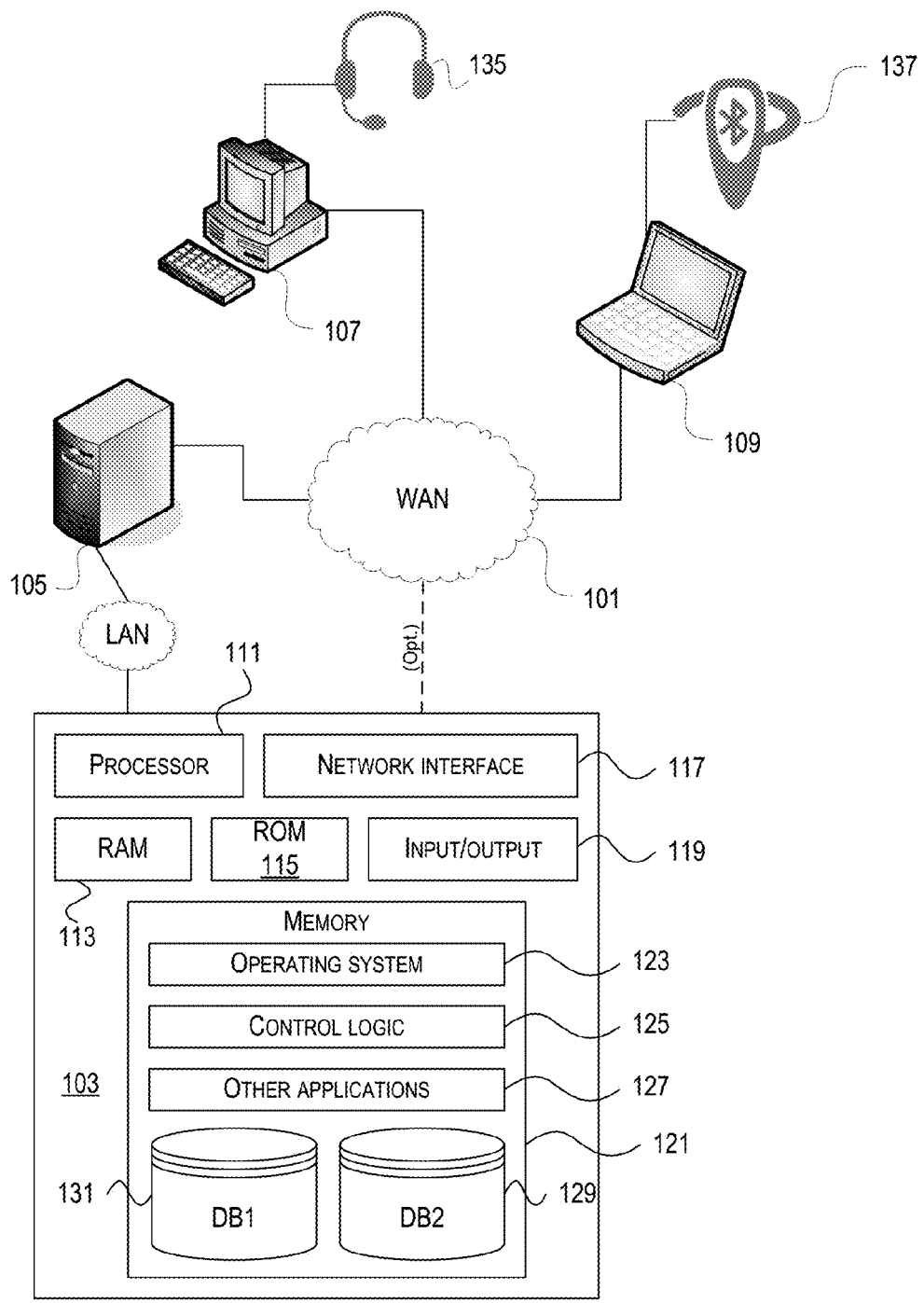
FIG. 1 depicts an illustrative computer system architecture that may be used in accordance with one or more illustrative aspects described herein.

In automated dialog systems, users may engage in a natural language dialog with a computerized dialog agent and converse in a coherent manner. Dialog agents are used across a broad range of applications in business enterprises, education, government, healthcare, and entertainment. Automated dialog systems may be used in lieu of customer service agents to perform basic tasks. Automated dialog systems may also be used in intelligent computerized personal assistants or mobile software agents that perform tasks or services based on user input and have the ability to access information from a variety of different sources such as the Internet, local networks and databases.

In some embodiments, automated dialog systems may perform a user task by conversing with the user in a natural language format. The automated dialog system may expect to receive information from the user in the natural language dialog to perform its functions. The dialog system may contain multiple different dialog states that it progresses through as a dialog with the user is executed. Each different dialog state may be associated with different dialog tasks or at least different steps of a dialog task, each step requiring certain information from the user.

In many instances, a user does not know what tasks or functions the automated dialog system is capable of performing. Furthermore, the user might not know what information the dialog system is expecting from the user in order to perform its functions. Accordingly, the user might not know of the appropriate speech command to input to the automated dialog system at one or more stages of the dialog. At such a point, the user may ask the dialog system for help in the form of a help request. Conventional systems return hardcoded responses to such user help requests. Such hardcoded responses are often not indicative of the current dialog because these responses do not take into account the dialog with the user in determining what to output to the user.

Therefore, the help responses may be inflexible and not very useful to the user in determining what to input to the automated dialog system at a given stage of the dialog to properly continue the dialog. In accordance with aspects of the disclosure, a data-driven dialog discovery system is provided which allows the automated dialog system to provide dialog context aware help responses to the user's help requests.

In some embodiments, a help agent may monitor the state of the automated dialog system and when a help request is received from the user, the help agent may identify what information the automated dialog system expects to receive from the user based on its current dialog state. The help agent may use information that the user has previously supplied to the dialog system during the conversation to accurately identify what information is expected to perform the task associated with the current state of the dialog system. For example, if the user has entered one piece of information in the past during the conversation and the automated dialog system requires three more pieces of information from the user to complete the currently executing task, the help agent may generate a help response when the user requests help on what to say next to the dialog system. The help agent may guide the user to provide the expected three pieces of information such that the dialog system may perform the task and progress to the next dialog state.

In some embodiments, the help agent may determine an optimal phrase to output to the user that will aid the user in inputting information that the automated dialog system will clearly understand. Such a phrase may be output to the user in the response to a user help request to guide the user to provide the necessary information. In order to guide the user to provide such a clear and syntactically correct response, the help agent may use NLU training data accessible to the automated dialog system to search for frequently occurring phrases that the user is most likely to use, hereinafter referred to as highrunners. When the user queries the automated dialog system for help, the help agent may identify the information the user needs to input and in order to convey this identified information to the user in the form of a coherent and easily comprehensible natural language response, the help agent may examine the highrunners in the NLU training data to identify the phrase or sentence that best describes the information that the automated dialog system requires when the user help request is received. The help agent may determine the phrasing for the response to the help prompt to guide the user in providing an input that the automated dialog system is guaranteed to understand.

In the following description of the various embodiments, reference is made to the accompanying drawings, which form a part hereof, and in which is shown by way of illustration various embodiments. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

FIG. 1 illustrates one example of a network architecture and data processing device that may be used to implement one or more illustrative aspects of the disclosure. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or might not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Client computers 107 and 109 may receive user speech commands using microphone 135 or Bluetooth headset 137. Client computer 107 may be connected to microphone 135 that detects user speech input that the client computer 107 may further process to receive user speech input for the dialog application. Similarly, client computer 109 may be in communication with a Bluetooth headset 137 that includes a microphone for detecting a user's speech commands for engaging in a dialog with the dialog system executed at least partially on client computer 109.

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
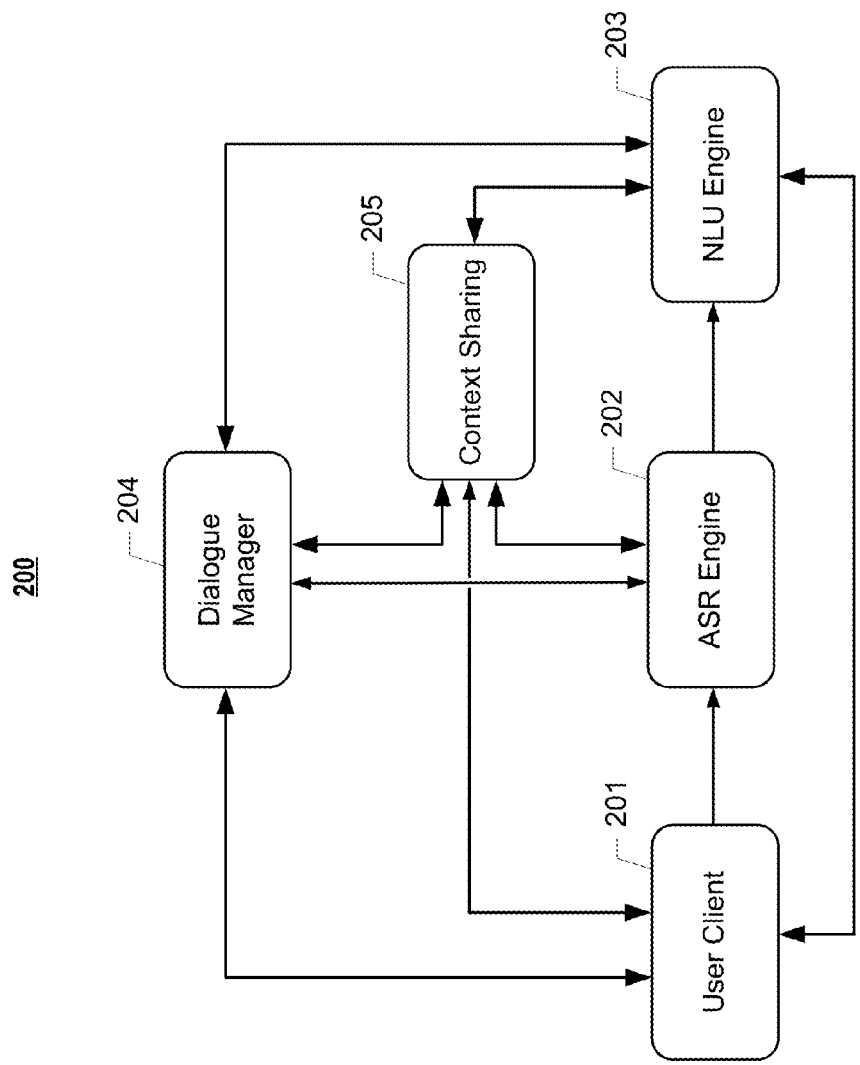
FIG. 2 depicts an illustrative multi-modal conversational dialog application arrangement that shares context information between components in accordance with one or more illustrative aspects described herein.

FIG. 2 depicts an example multi-modal conversational dialog application arrangement 200 that shares context information between components in accordance with one or more example embodiments. A client application 201 may deliver output prompts to a human user and may receive natural language dialog inputs, including speech inputs, from the human user. An automatic speech recognition (ASR) engine 202 may process the speech inputs to determine corresponding sequences of representative text words. A natural language understanding (NLU) engine 203 may process the text words to determine corresponding semantic interpretations. A dialog manager (DM) 204 may generate the output prompts and respond to the semantic interpretations so as to manage a dialog process with the human user. Context sharing module 205 may provide a common context sharing mechanism so that each of the dialog components—client application 201, ASR engine 202, NLU engine 203, and dialog manager 204—may share context information with each other so that the operation of each dialog component reflects available context information.

The context sharing module 205 may manage dialog context information of the dialog manager 204 based on maintaining a dialog belief state that represents the collective knowledge accumulated from the user input throughout the dialog. An expectation agenda may represent what new pieces of information the dialog manager 204 still expects to collect at any given point in the dialog process. The dialog focus may represent what specific information the dialog manager 204 just explicitly requested from the user, and similarly the dialog manager 204 may also track the currently selected items, which typically may be candidate values among which the user needs to choose for disambiguation, for selecting a given specific option (one itinerary, one reservation hour, etc.), and for choosing one of multiple possible next actions ("book now", "modify reservation", "cancel", etc.).

The dialog context may be any piece of information that can help contextualize the dialog state. For example, the dialog context may be formatted according to the needs and requirements of the automated dialog system being used to conduct the dialog. In a non-limiting example, a dialog context protocol may be defined as:

BELIEF=list of pairs of concepts (key, values) collected throughout the dialog where the key is a name that identifies a specific kind of concept and the values are the corresponding concept values. For example "I want to book a meeting on May first" would yield a BELIEF={(DATE, "2012/05/01"), (INTENTION="new_meeting")}.

FOCUS=the concept key. For example, following a question of the system "What time would you like the meeting at?", the focus may be START_TIME.

EXPECTATION=list of concept keys the system may expect to receive. For instance, in the example above, while FOCUS is START_TIME, EXPECTATION may contain DURATION, END_TIME, PARTICIPANTS, LOCATION, . . . .

SELECTED_ITEMS: a list of key-value pairs of currently selected concept candidates among which the user needs to pick. Thus a dialog prompt: "do you mean Debbie Sanders or Debbie Xanders?" would yield to SELECTED_ITEMS {(CONTACT, Debbie Sanders), (CONTACT, Debbie Xanders)}.

Communicating this dialog context information back to the NLU engine 203 may enable the NLU engine 203 to weight focus and expectation concepts more heavily. And communicating such dialog context information back to the ASR engine 202 may allow for smart dynamic optimization of the recognition vocabulary, and communicating the dialog context information back to the client application 201 may help determine part of the current visual display on that device.

Similarly, the context sharing module 205 may also manage visual/client context information of the client application 201. One specific example of visual context would be when the user looks at a specific day of her calendar application on the visual display of the client application 201 and says: "Book a meeting at 1 pm," she probably means to book it for the date currently in view in the calendar application.

The client application 201 may also communicate touch input information via the context sharing module 205 to the dialog manager 204 by sending the semantic interpretations corresponding to the equivalent natural language command. For instance, clicking on a link to "Book now" may translate into INTENTION: confirm Booking. In addition, the client application 201 may send contextual information by prefixing each such semantic key-value input pairs by the keyword CONTEXT. In that case, the dialog manager 204 may treat this information as "contextual" and may consider it for default values, but not as explicit user input.

In some embodiments, ASR engine 202 may process the speech inputs of users to text strings using speech to text conversion algorithms. ASR engine 202 may constantly pay attention to user feedback to better understand the user's accent, speech patterns, and pronunciation patterns to convert the user speech input into text with a high degree of accuracy. For example, ASR engine 202 may monitor any user correction of specific converted words and input the user correction as feedback to adjust the speech to text conversion algorithm to better learn the user's particular pronunciation of certain words.

In some embodiments, client application 201 may also be configured to receive non-speech inputs from the user such as text strings inputted by a user using a keyboard, touch-screen, joystick, or another form of user input device at client application 201. The user may also respond to output prompts presented by selecting from touchscreen options presented by client application 201. The user input to such prompts may be processed by dialog manager 204, context sharing module 205, and NLU engine 203 in a similar manner as speech inputs received at client application 201.

Dialog manager 204 may continuously be monitoring for any speech input from a client application, independent of tasks implemented at the dialog manager. For example, dialog manager 204 accepts voice commands from a user even when any tasks currently being implemented do not require a user input. A task manager, implemented by the dialog manager 204, may process the voice command and in response to the voice command, launch a new task or modify the execution of one or more tasks currently being implemented.

Figure 3:
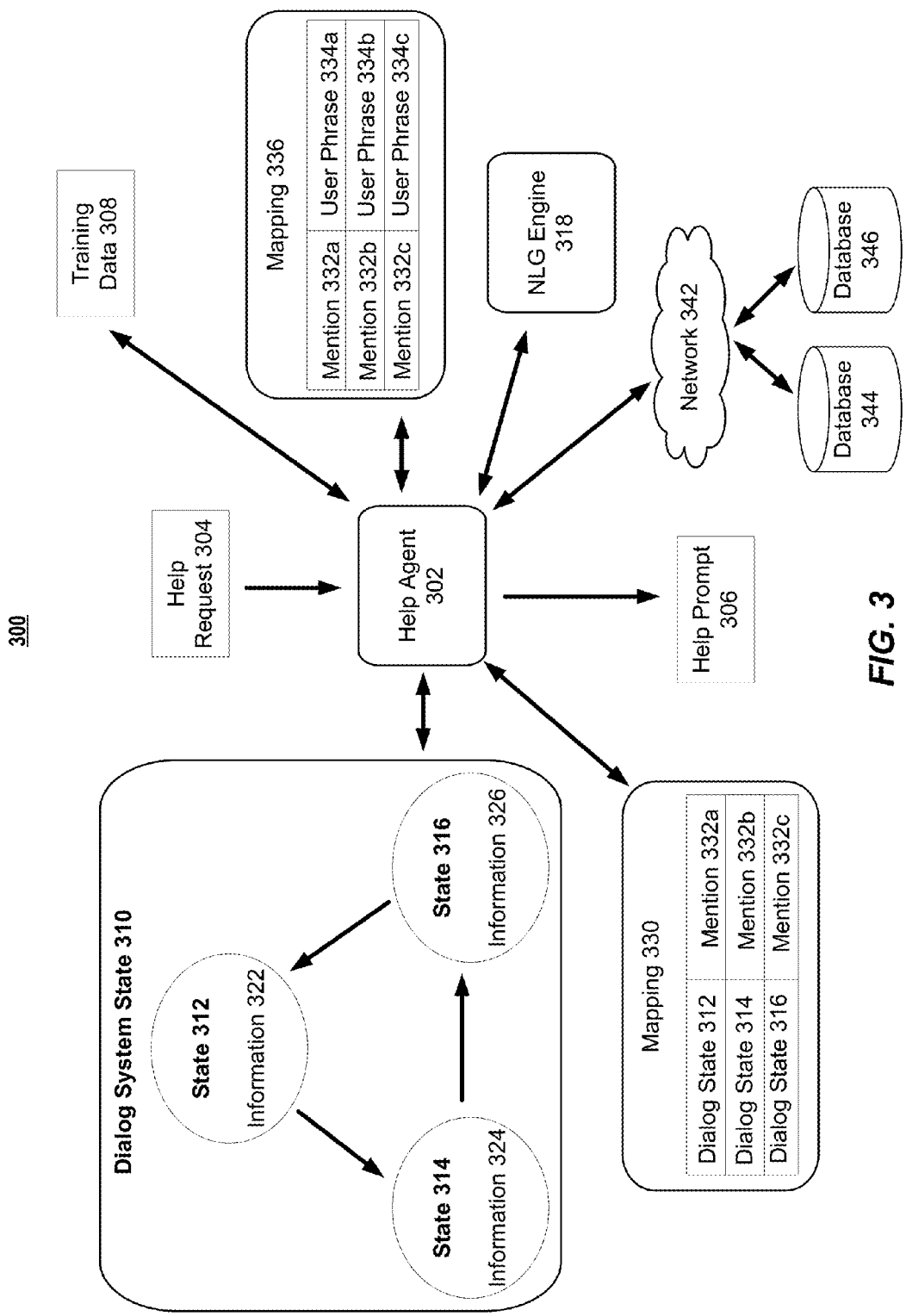
FIG. 3 depicts an illustrative diagram of the automated dialog system preparing a help prompt in response to a user help request in accordance with one or more illustrative aspects described herein.

FIG. 3 depicts an illustrative diagram of the automated dialog system 300 preparing a help prompt in response to a user help request. Help agent 302 may receive a help request 304 from a user. The help agent 302 may monitor the dialog system state 310 of dialog system 300 to identify the information required by the dialog system 300 when a help request 304 is received. Help agent 302 may further identify mentions associated with the current dialog state from mapping 330 of mentions to dialog states. The help agent 302 may identify an appropriate user phase to output as a response to the help request 304 from mapping 336 of user phrases to mentions. Help agent 302 may further identify an optimal user phrase from training data 308 accessible to dialog system 300 for outputting as a response to the help request 304. The help agent 302 may communicate with remote databases 344 and 346 over a network 342 to obtain additional information for inclusion in the help response 306. The help agent 302 may instruct a natural language generation (NLG) engine 318 to process the phrase and additional information from databases 344 and 346 selected for inclusion in the help prompt 306 such that the help prompt 306 contains the relevant information required by the user in a format that is consistent with the contextual cues of the dialog between the user and the dialog system 300.

In some embodiments, the help agent 302 may receive the help request 304 at any point in a dialog between a user and the dialog system 300. The help request 304 may be received through a user interface device such as a microphone. The help request 304 may be a speech input to the automated dialog system 300 which has already been natural language processed by natural language processing elements of the automated dialog system such as dialog manager 204, ASR engine 202, and NLU engine 203 described in FIG. 2. The help request 304 may be processed by such components such that the help request is in a format comprehensible by system 300. The help agent 302 may continuously or periodically monitor for any incoming help requests such as help request 304 from the user.

In some embodiments, the dialog system 300 may manage the dialog for voice response applications that have been developed with a digital document standard for specifying interactive media and voice dialogs between humans and computers such as VoiceXML (VXML). The dialog system 300 may include VXML interpreters such as OpenVXI. The dialog system 300 may accordingly identify which VXML fields or VXML information is required at each dialog state in order for the dialog system to perform the various functions of its dialog applications.

In some embodiments, the dialog system 300 may manage the dialog for a hierarchical task dialog system as described in U.S. patent application Ser. No. 14/456,652 filed on Aug. 11, 2014, the contents of which are herein incorporated by reference. The dialog system 300 may be able to identify the information that is expected by such a dialog system. For instance, the dialog system 300 may examine an expectation agenda of the dialog system to determine which information is expected from the user at each state of the dialog application to control the flow of the dialog and to perform the dialog system's functions.

In some embodiments, once the help request is received by the help agent 302, the help agent 302 may identify the state 310 of the dialog system 300. The help agent 302 may identify the state 310 by querying the digital logic circuits of the dialog system 300 (e.g., registers, flip flops, latches, data caches, and other memory elements). The dialog state 310 of the dialog system may include information on which applications the dialog system is currently engaged in and accordingly what information the dialog system requires from the user in order to perform the relevant application functions. For example, the state 310 of the dialog system may identify which dialog agent is currently executing and identify, from the expectation agenda field for that dialog agent, the information expected by the dialog agent to perform the dialog application functions. Alternatively, the state 310 of the dialog system may identify which VXML fields need to be populated at that step in order for the dialog application to proceed to the next state of the dialog. The state diagram of the dialog system state 310 illustrated in FIG. 3, as an example, indicates that the dialog system 300 may comprise of three states, state 312, 314, and 316. Information 322, information 324, and information 326 may be expected by the dialog system 300 at state 312, 314, and 316, respectively. Each state may require one or more piece of information from the user, as identified by an expectation agenda or VXML field(s) of the dialog system at that corresponding state.

In some embodiments, a mapping 330 may be generated by the dialog system 300 that maps each of the dialog states with a set of different mentions (e.g., words, phrases or VXML fields) that are expected by the dialog system 300 at each dialog state. Such a mapping 330, also referred to as the dialog representation, may be generated by the dialog system 300 before any user inputs are received or any dialog is conducted with a user. In the example of FIG. 3, mapping 330 may include an association between dialog states 312, 314, 316 and mentions 332a, 332b, and 332c. Once the help agent 302 has identified which state of the dialog the dialog system is currently in, the help agent 302 may identify the associated mentions for that identified state from mapping 330. For example, help agent 302 may determine that dialog system 300 is at dialog state 312 at the time the help request 304 is received. Accordingly, help agent 302 may identify that mention 332a is expected by the dialog system 300 at dialog state 312 from mapping 330. In this manner, the help agent 302 may be able to identify the relevant mentions and information expected by the dialog system at any step of the dialog process. Accordingly, the help agent 302 may be aware of which mentions are expected to be filled at every step of the automated dialog. User entry of such mentions allows the user to control the flow of the dialog such that the dialog system 300 may properly assist the user in performing the application functions that he or she desires to have the dialog system 300 perform.

In some embodiments, the help agent 302 may determine an appropriate phrase from NLU data to incorporate in a response to the help request 304. Once the help agent 302 has identified the information (e.g., mentions or intentions) that the dialog system 300 expects to receive from the user device, the help agent 302 may query training data 308 to identify an appropriate phrase to output to the user. Training data 308 is typically available to dialog system 300 in order for the dialog system 300 to understand user inputs. For example, most automated dialog systems use training data to be able to explore possible dialog states and strategies to better understand user inputs. Accordingly, the training data 308 may include specific user utterances (e.g., user sentences or phrases) that the dialog system 300 expects to receive as input from the user. The dialog system 300 typically uses such training data to better understand user inputs and to accurately identify the user intention associated with the received user input. The user intention may be usually extracted from the global meaning of a user input phrase or sentence. By examining specific words of the user input phrase or sentence, one or more mentions may be identified. The training data 308 may include several different user utterances. The training data 308 may also include an associated weight for each of the different user utterances based on how frequently users use such utterances in dialog with automated dialog system 300. The training data 308 may be constantly updated as a result of the dialog system 300 interacting with the user. For example, as a result of continued interaction with the user, the dialog system 300 may add new utterances to the training data 308 or update the weighting of the previously existing utterances in the training data 308.

In some embodiments, the dialog system 300 may generate a mapping 336 between the different mentions that the dialog system expects to receive at various dialog states from the user and NLU utterances in the training data 308. The dialog system 300 may generate mapping 336 based on the currently existing user utterances, also referred to as user phrases hereinafter. For example, mapping 336 may associate mentions 332a, 332b, and 332c with user phrases 334a, 334b, 334c, respectively. The dialog system 300 may use the inverse of this mapping 336 to identify user phrases or utterances to include in help prompt 306 given a mention that it has identified from mapping 330 based on the dialog state at the time that the help request was received.

In some embodiments, the help agent 302 may select the best user phrase that matches the identified mention from the NLU training data 308. For example, if multiple different user utterances or NLU samples in training data 308 correspond to the mention identified by help agent 302 that the dialog system requires at the current dialog state, the help agent 302 may select one of the matching NLU training data samples based on the weights of each of the matching training data samples. For example, the help agent 302 may pick the highrunners or the training samples that occur the most frequently in users' conversations, thereby resulting in a higher weight than the other matching NLU training data samples.

In some embodiments, the NLU training data 308 might not previously exist in the dialog system 300 prior to the generation of help prompt 306. For example, the dialog system 300 may use a form of NLU that is not based on training data but instead is comprised of hardcoded set of rules. For example, if the dialog system 300 uses a speech recognition grammar specification such as GrXML. For example, if the dialog system 300 uses a version of VXML that uses a set of hardcoded grammar rules such as GrXML to understand the user utterances and convert them to mentions, such a dialog system 300 might not include NLU training data 308. In such an example, the dialog system 300 may generate substitute training data from the hardcoded grammar rules in an automated or a semi-automated manner. Such substitute training data may use the grammar rules to generate a set of user utterances that correspond to different mentions expected by the dialog system 300. Accordingly, a mapping 336 may be generated from such substitute training data associating the various different mentions with different user utterances according to the hardcoded grammar rules set forth in the speech recognition grammar specification.

In some embodiments, the help agent 302 may communicate with remote databases such as databases 344 and 346 over network 342 to obtain additional information to include in help prompt 306. The information that help agent 302 may obtain from remote databases may vary based on the dialog application and more specifically, the application function being managed by the dialog system 300 during the dialog state at which help request 304 is received. For example, if the dialog system 300 is executing a dialog application related to movie searches and the user asks for help regarding what possible functions can he ask the dialog system 300 to perform, the help agent 302 may determine that one of the expected information associated with the dialog state during which the user help request is received corresponds to the user specifying movie titles and/or specifying a movie genre. Accordingly, the help agent 302 may determine that in order to properly guide the user to input such information in the format the dialog system 300 is expecting, a help prompt 306 specifying a movie title should be outputted to the user. Accordingly, the help agent 302 may query an external database 344 such as the Internet Movie Database (IMDb) to determine current movie names to output in the help prompt 306.

In some embodiments, the help agent 302 may modify or replace the NLU training data samples originally identified for inclusion with other types of data. For example, the help agent 302 may modify or replace the NLU training data samples with information from an external data source that is remote to the automated dialog system. For example, such information may be obtained from the results of a database search. For example, the help agent 302 may determine that the help request is asking the dialog system about a specific type of information such as what movies are available or what conference rooms are available for booking a meeting. In such instances, the help agent 302 may perform a database search to tailor a help prompt generated in response to the user help request by retrieving movie titles from a database. Upon performing the database search, the help agent 302 may be able to construct the help prompt using the database search result and the context of the conversation (i.e., words from the help request and previous dialog). In this case, the help agent 302 modify or replace the NLU training data samples matching the expected information by the dialog system at the given dialog state with the database search result to satisfy the user help request. Additionally or alternatively, the help agent 302 may modify or replace the NLU training data samples with preconfigured values. For example, if the help agent 302 already has the information that the user is requesting available locally, the help agent 302 may obtain such preconfigured values for output in the output help prompt. The help agent 302 may retrieve user utterances from the NLU training data to obtain at least a portion of the sentence structure for the desired help prompt. The help prompt 302 may replace some of the user mentions in the NLU training data user utterances with words or phrases from the external data source. Such a replacement may allow the help agent 302 to construct a customized help prompt with a grammatically correct sentence structure that is responsive to the user's help request. In some embodiments, the help agent 302 might not even obtain NLU training data samples and may instead directly use either information obtained from a database query or a preconfigured value for output in the help prompt.

In some embodiments, the help agent 302 may instruct the NLG engine 318 to process the selected information for output in help prompt 306 into a natural language dialog prompt that is contextually in keeping with the dialog between the user and the dialog system 300. The help agent 302 may input the user utterance selected from training data 308 best determined to match the mention expected by the dialog system 300, additional information from external databases, and past dialogs in between the user and the dialog system 300 during the conversation. The NLG engine 318 may process such information to compose a natural language help prompt 306 that is in keeping with the conversation. For example, the NLG engine 318 may phrase the help prompt 306 such that it seems to be structured to be a response to the previous dialog inputs from the user.

In some embodiments, the help agent 302 may be able to process inputs received in various different languages. For example, the help agent 302 may be configured to process and understand user help requests that are received in a variety of different languages. The help agent 302 may be also configured to generate help prompts in a variety of different languages. In some embodiments, the help agent 302 may generate help prompt 306 in the language in which the help request 304 was received in by identifying the language of the help request 304. In another embodiment, the help agent 302 may generate help prompt 306 in a predefined language set for outputting help prompts independent of the language of the help request 304.

Figure 4:
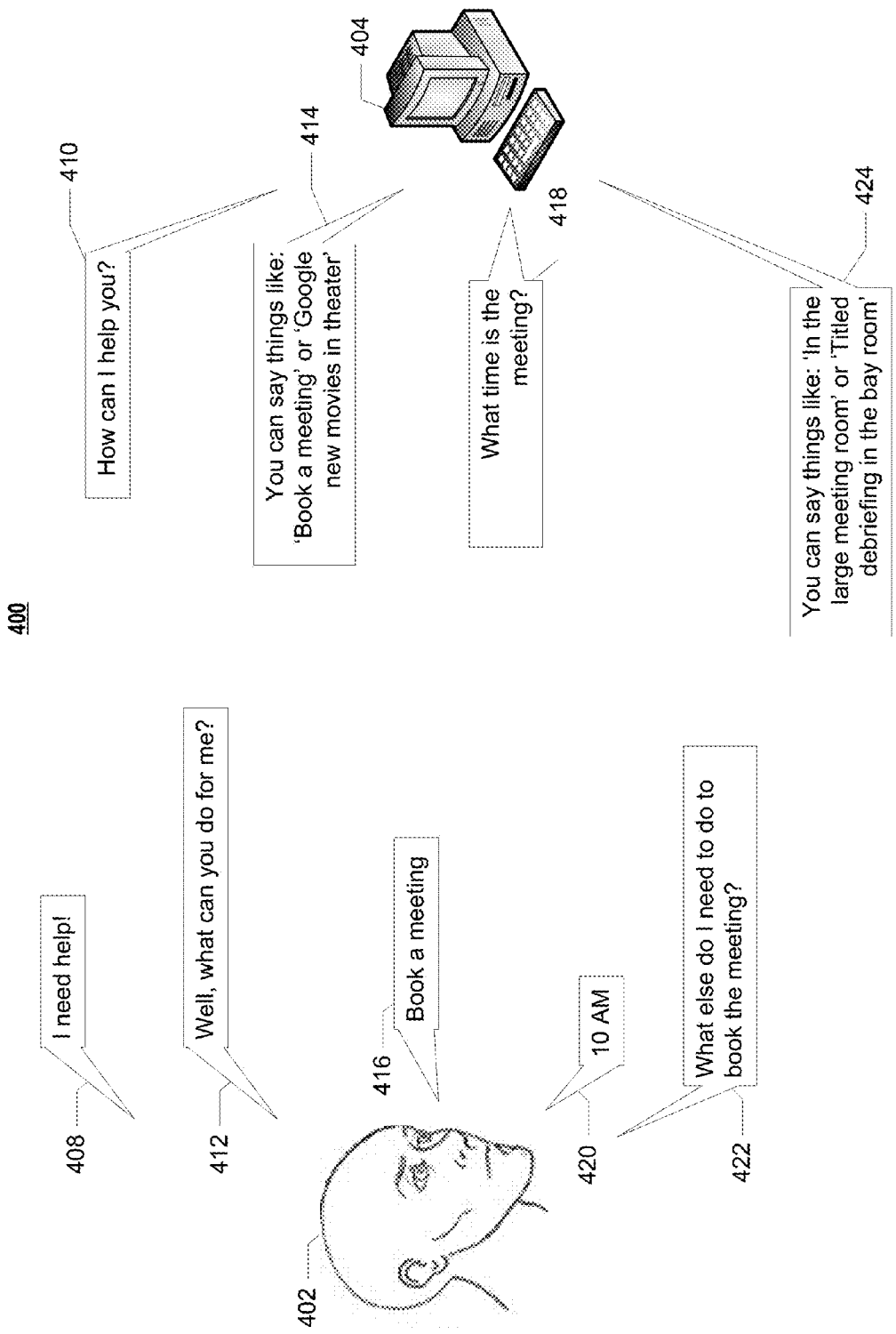
FIG. 4 depicts an illustrative diagram of a dialog conducted by the automated dialog system with a user to provide the user with a help prompt in accordance with one or more illustrative aspects described herein.

FIG. 4 depicts an illustrative diagram of a dialog 400 conducted by the automated dialog system with a user to provide the user with a help prompt. The dialog 400 is conducted between user 402 and a computing device 404. The computing device 404 may be a personal computer, a mobile computing device, or a distributed computing device. All or at least portions of dialog system 300 of FIG. 3 may be executed on the computing device 404. The computing device 404 may generate help prompts for audio output for presentation to user 402. For example, the computing device may use text to speech synthesis methods to output its statements and outputs.

According to the example shown in FIG. 4, the computing device 404 may output help query 410 in response to user help request 408. The user may issue help requests 412 and 422, to which the computing device 404 may respond with help prompts 414 and 424, respectively. Computing device 404 may continuously monitor user dialog inputs for help requests. The computing device 404 may also receive user inputs such as input 416 and 420 and generate dialog outputs such as statement 418 during the course of performing a dialog application function, such as scheduling meetings and conducting web searches.

In some embodiments, the dialog system may continuously monitor user inputs for user help requests. The dialog system may identify help requests from other forms of user speech input by monitoring user inputs for specific help keywords such as 'help,' 'what can you do,' 'what do I need to do,' 'how do I,' 'can you,' etc. The dialog system may also identify help requests from user inputs upon processing user inputs and determining the intention of the user input. For example, even if the user input does not contain any of the help request keywords that the dialog system typically monitors, the dialog system may determine that the user input is a help request upon resolving the intent of the entered user input upon natural language processing the user input. The user may input a generic help request such as help request 408 merely stating "I need help." The dialog system may determine that the nature of the help request needs to clarified and may output help query 410 to direct the user to enter a more specific help request. Once the user enters a help request 412 querying computing device 404 for its supported functionalities, the dialog system may respond with help prompt 414 to better guide the user to input information expected by the dialog system at that given stage of the dialog.

In some embodiments, the dialog system may output help responses depending on the state of the dialog. Once the dialog system has determined that a help request has been received, the dialog state may be queried to determine what type of help response (i.e., help response 414 or 424) to output. The dialog system may determine the state of the dialog and accordingly identify what information is expected to be input from the user and what application functions are to be performed at the identified dialog state. For example, once the dialog system determines that help request 412 has been received at computing device 404, the dialog system may identify that the state of the dialog system at the time that help request 412 is received at computing device 404. In the example of FIG. 4, such a state may be an initial state at which the user has not begun any tasks and the dialog system is awaiting user selection of a dialog application or task. Accordingly, the dialog system may determine that at this state, the dialog system is expecting the user to supply it with an indication of which dialog application of its many supported dialog applications or tasks to execute. The dialog system may, accordingly, generate help prompt 414 stating two functions of the dialog system: booking meetings and web searching. However, if the dialog system receives a help request at a different stage of the conversation when the dialog system is not in an initial state such as help request 422, the dialog system may generate a different help prompt such as help prompt 424. For example, once the dialog system receives help request 422, the dialog system may determine the dialog state at that time. The dialog state may correspond to a state involved in a meeting scheduling dialog task. The dialog system may accordingly generate help prompt 424 outputting information expected by the dialog system during the identified state such as location and title of the meeting.

The dialog system may also determine what type of help response to output based on the type of help request. If the help request is a query about the basic functionalities of the dialog system such help request 412, the dialog system may output a help response 414 upon determining that the help prompt 412 is querying about the system functionalities of the dialog system. However, the dialog system may determine that user 402 has a question about the functions of a specific dialog task such as in help request 422 by examining the help request for contextual clues. For example, the dialog system may identify that help request 412 contains keywords for a help request and keywords related to the currently executing dialog task (i.e., 'book the meeting'). Accordingly, the computing device 404 may output help response 424 targeted to guide the user in entering information required to complete the dialog task.

In some embodiments, the dialog system may use NLU training data to generate help responses. Once the help request is received at computing device 404, the dialog system may identify what information is expected to be input by identifying the dialog state and identify the mention expected by the dialog system my examining a mapping between dialog states and associated expected mentions such as mapping 330 of FIG. 3. Once the expected mention has been identified, the dialog system may identify which user utterances in the NLU training correspond to the expected mentions. The NLU training data may be conversation independent and may be a system resource for the dialog system to use to learn how to interpret received user inputs during natural language processing of received user inputs. The NLU training data may have a mapping such as mapping 336 of FIG. 3 that identifies corresponding user utterances for different mentions. The dialog system may select highrunners from the resulting user utterances matching the identified mention. The dialog system may use the sentence structure and even a few keywords from the identified highrunner user utterance for use in the output help prompt. According to the example of FIG. 4, if the dialog system determines that, in response to help request 412, it is to output a user mention for performing a web search, the dialog system may search the NLU training data for the web search intention "I_REQUEST_WEB." The dialog system may determine that there exist two different mentions in the training data corresponding to such a user intention for two different web search entities: Google and Bing. For example, the two identified NLU training data entries may be "Search Bing; I_REQUEST_WEB; ENTITY: Bing; prob: 0.01" and "Google; I_REQUEST_WEB; ENTITY: google; prob: 0.99." These NLU training data entries indicate the weights associated with each entry. The dialog system may accordingly pick the Google training data entry because it is the highrunner. Accordingly, the dialog system may construct the help prompt 414 by including the phrase "Google." The dialog system may further identify that at the identified dialog state, a mention for scheduling a meeting may also be expected. Accordingly, the dialog system may identify a user utterance such as "book a meeting" that corresponds to such an expected mention. The dialog system may composite both the web search user utterance the schedule meeting utterance into the same help prompt 414 to inform the user 402 of the available options for dialog system functions.

In some embodiments, the dialog system may generate help responses by examining the past dialog inputs of the user. The dialog system may keep track of the user inputs received from user 402 during the course of dialog 400 in order to better guide the conversation and to output help prompts that follow the dialog flow. For example, if the user has previously supplied the dialog system with information expected at the current state, the dialog system may identify that information and may output information that is still needed. For example, once computing device 404 receives help request 422 from user 402, its dialog system determines that the current dialog state requires the user to input a time, location, and title of the meeting. The dialog system then identifies that the user has already provided the time of the meeting at input 420 and accordingly provides examples of location and title of the meeting in help prompt 424.

In some embodiments, the dialog system may monitor the conversation to determine if the user has shifted focus of the conversation from the initial task. For example, user 402 may be providing computing device 404 with dialog input for multiple different tasks and dialog applications during the course of a dialog 400. The dialog system may be engaged in dialog that is not limited to a particular task but instead may gather inputs for multiple different dialog applications during the course of a natural language dialog. In such an embodiment, the dialog system may analyze the flow of the conversation to determine if the focus of user 402 has shifted from one particular task to another task and accordingly, emphasize information related to the task that the user is currently focused. In one implementation, the dialog system may only output help information for the currently focused task. In another implementation, the dialog system may output information for the focused task before outputting information for the tasks with less user focus.

In some embodiments, the dialog system may retrieve dynamically changing data from external sources for output in help responses. The dialog system may include examples of possible user inputs in the help prompt to better guide the user in inputting user commands. For instance, if one of the functions of the dialog systems is to search for new movies, the help prompt 414 may query a movie database to retrieve a new movie name to use as an example in the help prompt. When the user queries what the system can do, computing device 404 may output a help prompt that states "You can say things like search for a new action movie like 'Guardians of the Galaxy.'" Such an output guides the user 402 with a template for providing a movie search query by including the name of a new movie such as 'Guardians of the Galaxy.' The user 402 now knows that an acceptable format to provide the user a search command is to specify the genre of the new movie and provide an example of a movie name in the specified genre. Similarly, the dialog system may provide examples of other types of dynamic data in dialog applications that use such dynamic data. The inclusion of such dynamic data in help prompts helps the user 402 quickly understand how to provide pointed commands in a format the dialog system will understand and that communicates context for the dialog system to fetch targeted information or perform a specific action. In some embodiments, such dynamic data may be periodically retrieved from remote databases. In other embodiments, the dynamic data may be obtained in response to a help request as the dialog system issues a request for new dynamic data to supply as an example in the help prompt. The dynamic data is retrieved from the remote database and input into an NLU engine along with the highrunner user utterance matching an identified mention to generate a help prompt.

Figure 5:
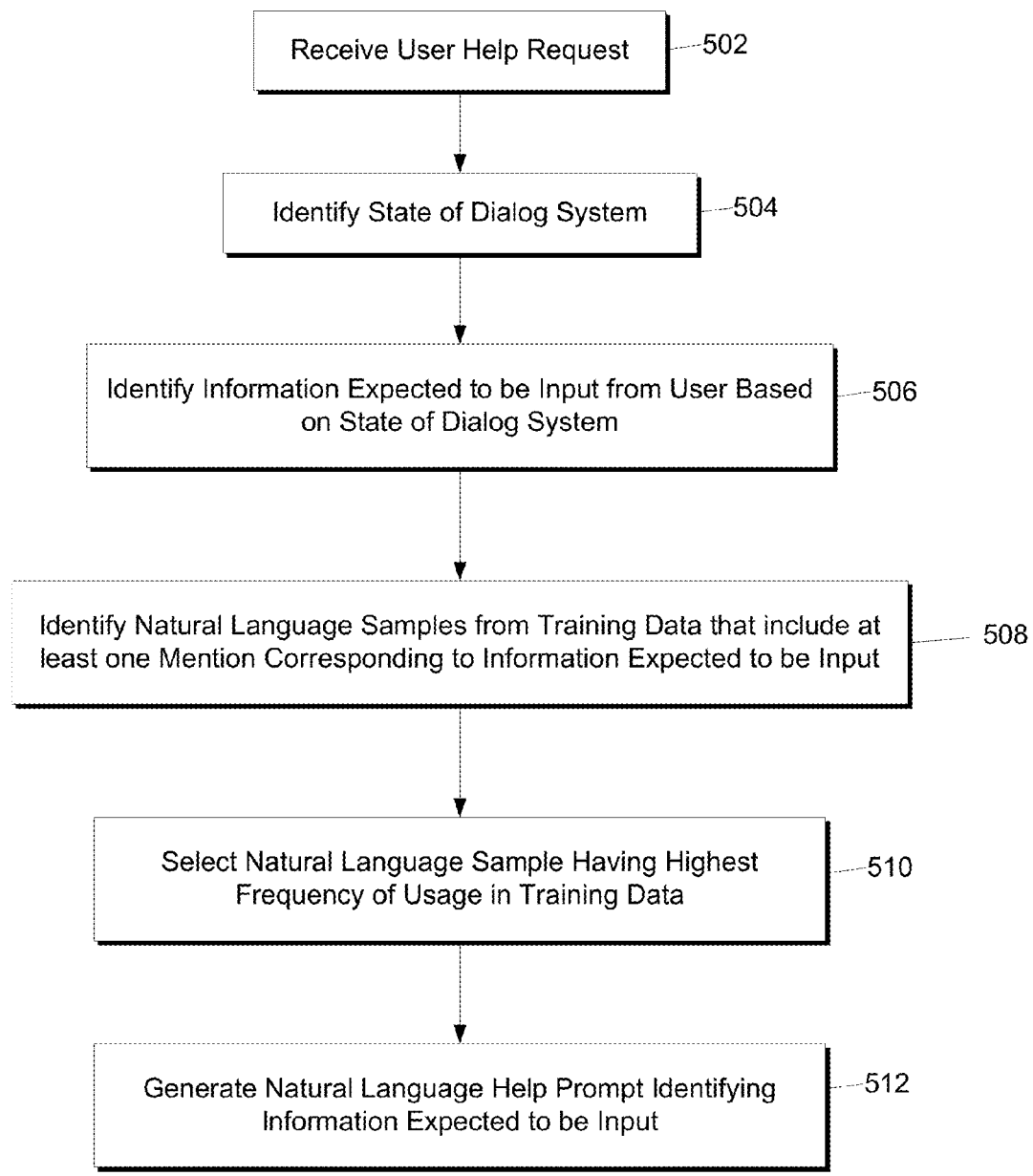
FIG. 5 depicts a flowchart that illustrates a method for generating a help prompt in response to a user help request in accordance with one or more illustrative aspects described herein.

FIG. 5 depicts an illustrative method 500 for generating a help prompt in response to a user help request in accordance with one or more embodiments. In one or more embodiments, method 500 of FIG. 5 and/or one or more steps thereof may be performed by an automated dialog system running on a computing device (e.g., client computing devices 107 and 109 or data server 103). In other embodiments, method 500 illustrated in FIG. 5 and/or one or more steps thereof may be embodied in computer-executable instructions that are stored in a computer-readable medium, such as a non-transitory computer-readable memory.

As seen in FIG. 5, the method may begin at step 502 in which the computing device may receive a help request. The computing device may receive the user request by recording the audio input through a user interface of the computing device such as a microphone or a Bluetooth headset. The audio input may be converted to text using speech to text algorithms and then processed by an NLU engine to identify the intent and content of the user input. Additionally or alternatively, the computing device may receive the user request as a text input. For example, the computing device may receive a natural language text input from the user via a chat interface. The computing device may determine that the user input contains NLU triggers such as help keywords or has the intent of a help request and accordingly, detects that a help request has been received.

At step 504, the computing device may identify the state of the dialog system. Once the computing device receives the help request, the computing device may identify the state of the dialog system at the time the help request was received. For example, the computing device may examine which dialog applications are currently active and the stage of implementation of each active dialog application to determine the dialog system state. The computing device may query its memory units, registers, and caches to identify such information to determine the active process of the dialog system underway at the time the help request is received.

At step 506, the computing device may identify information expected to be input from the user based on the state of the dialog system. The computing device may identify what information is expected by the dialog system at the time the help request was received. For example, the computing device may identify at least one mention that is associated with the identified dialog state. In some embodiments, such a mention may be identified by examining an expectation agenda of a dialog agent/agency dialog system. In other embodiments, such a mention may be identified by examining the VXML field and/or form corresponding to the current state of execution of the dialog system. In another embodiment, the mention may be identified by performing a table lookup in a mapping of mentions to dialog states. By examining the current dialog application that is executing, the dialog system may identify what information is needed by the application from the user in order to execute a dialog application function.

At step 508, the computing device may identify natural language samples from the training data that include at least one mention corresponding to information expected to be input into the dialog system. Once the computing device has identified which mentions it expects from the users when the user help request is received, the computing device may access the NLU training data to determine how to best construct a natural language dialog help prompt guiding the user to enter the identified mentions so that the dialog system can progress forward. The computing device may access the NLU training data that it may typically use to better understand input user prompts. For example, a dialog system may use a conversation independent repository of NLU training data comprising mappings of different user utterances to mentions and intents to train how to better understand user inputs. The dialog system may use such an NLU training data now to do the opposite: identify user utterances for output in the help prompt given a mention. The computing device may select one or more natural language user utterances or samples from the NLU training data that match the mention(s) identified At step 510, the computing device may select a natural language sample having the highest frequency of usage in the training data. If there are multiple resulting training data samples that match the identified mention, the computing device may select the sample having the highest frequency of usage in conversation. Such weighting may be associated with each sample in the training data. By selecting the highest frequency usage sample, the computing device may ensure that its help prompts are easily understood by the user.

At step 512, the computing device may generate a natural language help prompt identifying the information expected to be input into the dialog system. Once the natural language user utterance has been selected for output, the computing device may process, in an NLG engine, the natural language sample along with any relevant data obtained from external databases and from the dialog. The computing device may natural language process such data to make sure that the generated help prompt is in line with the flow of the conversation and incorporates all the data determined for inclusion in the help prompt in a grammatically and syntactically correct form. Once natural language prompt is generated, the computing device may output the help prompt to the user as an audio output by converting the help prompt to an audio sample using text to speech algorithms.

Figure 6:
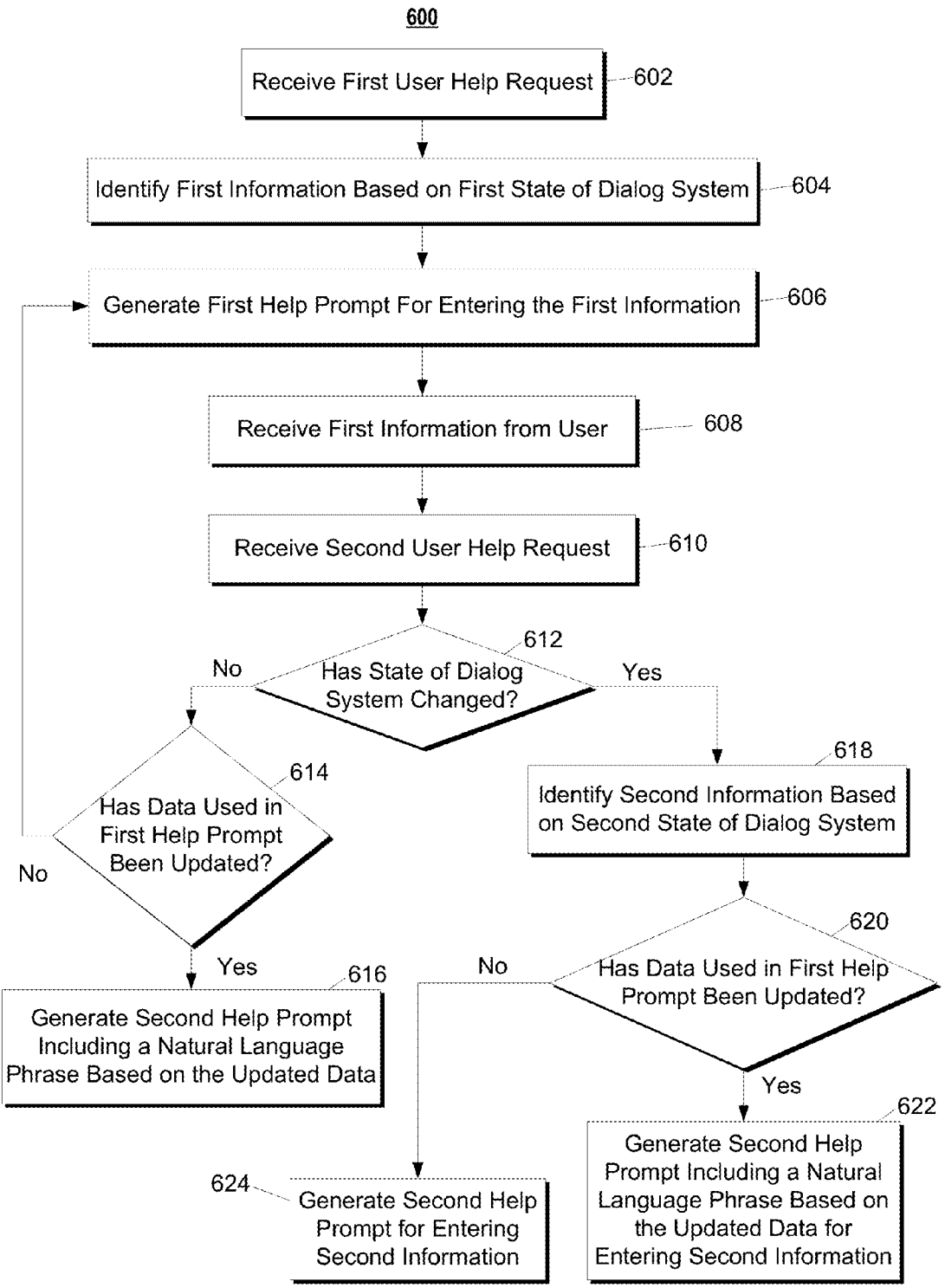
FIG. 6 depicts a flowchart that illustrates a method by which an automated dialog system provides a user with dialog context aware help prompts in accordance with one or more illustrative aspects described herein.

FIG. 6 depicts a flowchart that illustrates a method by which an automated dialog system provides a user with dialog context aware help prompts. In one or more embodiments, method 600 of FIG. 6 and/or one or more steps thereof may be performed by an automated dialog system running on a computing device (e.g., client computing devices 107 and 109 or data server 103). In other embodiments, method 600 illustrated in FIG. 6 and/or one or more steps thereof may be embodied in computer-executable instructions that are stored in a computer-readable medium, such as a non-transitory computer-readable memory.

As seen in FIG. 6, the method may begin at step 602 in which the computing device may receive a first user help request. The computing device may receive the user request by recording the audio input through a user interface of the computing device such as a microphone or a Bluetooth headset. The audio input may be converted to text using speech to text algorithms and then processed by an NLU engine to identify the intent and content of the user input. Additionally or alternatively, the computing device may receive the user request as a text input. For example, the computing device may receive a natural language text input from the user via a chat interface. The computing device may determine that the user input contains NLU triggers such as help keywords or has the intent of a help request and accordingly, detects that a first help request has been received.

At step 604, the computing device may identify first information expected to be input based on the first state of the dialog system. Once the computing device receives the help request, the computing device may identify the state of the dialog system at the time the help request was received. For example, the computing device may examine which dialog applications are currently active and the stage of implementation of each active dialog application to determine the dialog system state. The computing device may identify what information is expected by the dialog system at the time the help request was received. For example, the computing device may identify at least one mention that is associated with the identified dialog state. By examining the current dialog application that is executing, the dialog system may identify what information is needed by the application from the user in order to execute a dialog application function.

At step 606, the computing device may generate the first help prompt for entering the identified first information. Upon identifying the first information expected by the dialog system during the first state when the first help request was received, the computing device may generate the first help prompt according to the processed described in steps 508, 510, and 512 of FIG. 5. For example, the computing device may select a user utterance from the NLU training data matching the identified first information (i.e., the mentions expected by the dialog system at the first dialog state). If multiple NLU training data samples match the identified first information expected to be input, the computing device may select the highrunner of the NLU training data samples. The computing device may also obtain relevant dynamic data from external databases relevant to the dialog application for which the first help prompt is being generated. For example, the computing device may obtain information about movies to provide as an example in the first help prompt if the first help prompt is being generated to guide the user to enter a movie name. Once the natural language user utterance has been selected for output, the computing device may generate the first help prompt by either modifying the user utterance with information from the results of a database query. The computing device may append a pre-prompt such as "You can say:" to the selected user utterance or the modified user utterance to generate the first help prompt. Once natural language first help prompt is generated, the computing device may output the first help prompt to the user as an audio output by converting the first help prompt to an audio sample using text to speech algorithms. Additionally or alternatively, the computing device may output the second help prompt to the user as text.

At step 608, the computing device may receive the first information from the user. The computing device may receive a user input in response to the help prompt. The computing device may determine if the user input includes the first information. When the computing device identifies that the first information was received from the user, the computing device may use the first information to perform the functions of the dialog application. The computing device may generate multiple dialog outputs for the user and carry on a dialog as it is implementing the dialog application. The computing device may be monitoring all user inputs received for NLU triggers indicating a help request.

At step 610, the computing device may receive a second user help request. During the course of the dialog after the first help prompt has been generated, the computing device may identify that a subsequently received user input comprises a second help request. The computing device may determine that the user input contains NLU triggers such as help keywords or has the intent of a help request and accordingly, detects that a help request has been received.

At step 612, the computing device may determine whether the state of the dialog system has changed from the state at which the first help request was received. Once the computing device receives the second help request, the computing device may identify the state of the dialog system at the time the second help request was received. For example, the computing device may examine which dialog applications are currently active and the stage of implementation of each active dialog application to determine the dialog system state. Once the computing device has determined the dialog state, the computing device may determine if the identified dialog state is different from the first dialog state. The computing device may determine if the same dialog applications and functions that were active during the first dialog state are still active and performing the same functions. The computing device may determine if the dialog system still needs the same first information from the user or parts of the first information. For example, the dialog information may have required three different pieces of user information as part of the first information during the first help request. In response to the help prompt, the user may have supplied the dialog system with one of the three required pieces of first information and two additional pieces of the first information may be required. In some embodiments, such a determination may result in identifying that the dialog state has not significantly changed from the first state. On the contrary, the computing device may determine that when the second help request has been received, the dialog system may be performing different dialog tasks or even a different dialog application from when the first help request was received. The information required may be accordingly very different at this second state as second information may be required from the user to fulfill the requirements of the dialog tasks and applications executing during the second dialog state. In some embodiments, such a determination may result in identifying that the dialog state has changed from the first dialog state to different second dialog state.

At step 614, in response to determining that state of the dialog system has not changed, the computing device may determine whether the data used in the first help prompt has been updated. For example, the computing device may examine the data source from which the relevant data in the first help prompt is obtained. The computing device may analyze such a data source to determine if there is updated data that was not available when the first help prompt was generated and whether the updated data matches the criteria for inclusion in the second help prompt. For example, the computing device may determine if there is any updated data relevant to the dialog function and the example selected for use in the help prompt. The computing device may query multiple data sources to find such updated data.

If it is determined that the data used in the first help prompt has not been updated, the method 600 may return to step 606 to generate the first help prompt identifying the first information expected to be input. If no such updated data is found, the computing device may identify what portion of the first information is still required from the user and may generate a help prompt using at least a portion of the first information that the dialog system expects to be input and the relevant data selected for inclusion in the first help prompt.

At step 616, in response to determining that data used in the first help prompt has been updated, the computing device may generate a second help prompt including a natural language phrase based on the updated data. The computing device may identify that the dynamically updated data source has been updated with new data that is pertinent to the output criteria of the help prompt. Accordingly, the computing device may retrieve such data from the data source to process along with the user utterance information selected based on what is expected by the system at the time the second request is received. Upon identifying the information expected by the dialog system, the computing device may select a user utterance from the NLU training data matching the identified expected information. Once the natural language user utterance has been selected for output, the computing device may process, in an NLG engine, the natural language sample along with any relevant dynamic data obtained from external databases and any data (i.e., conversational cues) from the dialog. The computing device may process such data to make sure that the generated second help prompt is in line with the flow of the conversation and incorporates all the data determined for inclusion in the second help prompt in a grammatically and syntactically correct form. Once natural language second help prompt is generated, the computing device may output the second help prompt to the user as an audio output by converting the second help prompt to an audio sample using text to speech algorithms. Additionally or alternatively, the computing device may output the second help prompt to the user as text.

At step 618, in response to determining that state of the dialog system has changed during step 612, the computing device may identify second information expected to be input based on the second state of the dialog system. Once the computing device has determined that the second state is different from the first state, the computing device may identify what information is expected by the dialog system at the time the help request was received. For example, the computing device may identify at least one mention that is associated with the identified second dialog state. By examining the current dialog application and more particularly, which application function is currently executing, the dialog system may identify what information is needed by the application from the user in order to execute the dialog application function.

At step 620, the computing device may determine whether the data used in the first help prompt has been updated. In some embodiments, this determination may be performed in a similar manner as the determination of step 614. For example, the computing device may examine the data source from which the relevant data in the first help prompt is obtained. The computing device may analyze such a data source to determine if there is updated data that was not available when the first help prompt was generated and whether the updated data matches the criteria for inclusion in the second help prompt. For example, the computing device may determine if there is any updated data relevant to the dialog function and the example selected for use in the help prompt. The computing device may query multiple data sources to find such updated data.

At step 622, in response to determining that the data used in the first help prompt has been updated, the computing device may generate a second help prompt for entering the second information that includes a natural language phrase based on the updated data. Upon identifying that both the state has changed from the first state to new second state and that the data in the dynamic data source has been updated, the computing device may generate a second help prompt using the updated data and utterances for entering the second information. The updated data may be retrieved from the data sources upon identifying that such updated data matches the output criteria of the second help prompt based on the application functions that are currently executing. The second information (i.e., mentions) that is identified based on the second dialog state of the dialog system may be used to identify new user utterances from the NLU training data corresponding to such second information. The computing device may process, in an NLG engine, the NLU utterance data along with any relevant dynamic data obtained from external databases and any data (i.e., conversational cues) from the dialog. The computing device may process such data to make sure that the generated second help prompt is in line with the flow of the conversation and incorporates all the data determined for inclusion in the second help prompt in a grammatically and syntactically correct form. Once the natural language second help prompt is generated, the computing device may output the second help prompt to the user as an audio output by converting the second help prompt to an audio sample using text to speech algorithms. Additionally or alternatively, the computing device may output the second help prompt to the user as text.

At step 624, in response to determining that the data used in the first help prompt has not been updated, the computing device may generate a second help prompt for entering the second information expected to be input by the dialog system. Upon determining that the data in the dynamic data sources has not been updated since the time when the first help request was received, the computing device may use the previously acquired data from such external data sources along with NLU user utterances that match the second information expected by the dialog system to generate the second help prompt. An NLG engine may process such data to generate the second help prompt for output. Once the natural language second help prompt is generated, the computing device may output the second help prompt to the user as an audio output by converting the second help prompt to an audio sample using text to speech algorithms. Additionally or alternatively, the computing device may output the second help prompt to the user as text.

Figure 7:
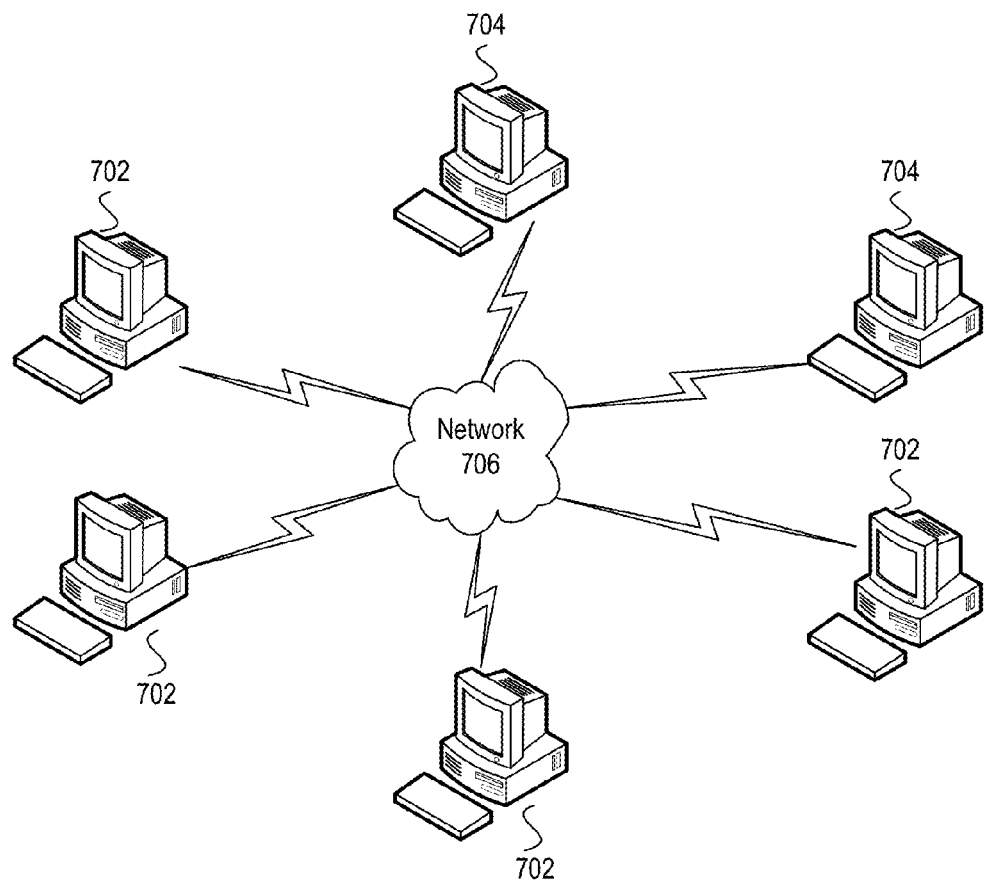
FIG. 7 depicts an illustrative computing environment in which one or more illustrative aspects described herein may be implemented.

In FIG. 7, an example of an implementation of a computing environment 700 in which aspects of the present disclosure may be implemented is shown. Client computing devices 702 and server computing devices 704 provide processing, storage, and input/output devices executing application programs and the like. Client computing devices 702 may include, e.g., desktop computers, laptop computers, tablet computers, palmtop computers, smartphones, smart televisions, and the like. Client computing devices 702 can also be linked through communications network 706 to other computing devices, including other client devices computing devices 702 and server computing devices 704. Communications network 506 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" does not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
receiving, by a computing device, a help request from a user of an automated dialog system, wherein the help request comprises a user request for information about one or more capabilities of the automated dialog system;
identifying, based on a state of the automated dialog system, information expected to be input by the user to request that the automated dialog system perform the one or more capabilities; and
generating, by the computing device and based on querying natural language training data for at least one natural language phrase, a natural language help prompt providing guidance to the user to provide the identified information expected to be input.

2. The method of claim 1, wherein the generating the natural language help prompt comprises:
identifying, from the natural language training data, a plurality of natural language samples, wherein each natural language sample comprises at least one mention corresponding to the identified information expected to be input; and
selecting a natural language sample from the plurality of natural language samples having a highest frequency of usage in the natural language training data.

3. The method of claim 1, wherein the identifying the information expected to be input comprises:
identifying components of the automated dialog system that require identified information expected to be input from the user to execute; and
determining the identified information expected to be input that the components require to progress to a next state of the automated dialog system.

4. The method of claim 1, wherein the identifying the information expected to be input comprises:
identifying the state of the automated dialog system; and
determining, from a mapping between states of the automated dialog system, information corresponding to the state.

5. The method of claim 1, wherein the generating the natural language help prompt comprises identifying, from a mapping between the information expected to be input and natural language phrases that the automated dialog system expects to receive from the user, the at least one natural language phrase.

6. The method of claim 1, wherein the natural language help prompt comprises information from a data source remote to the automated dialog system.

7. The method of claim 1, wherein the identified information expected to be input is updated as additional information is received by the automated dialog system.

8. The method of claim 1, wherein the identified information expected to be input is updated as the state of the automated dialog system is updated.

9. The method of claim 1, further comprising dynamically updating the natural language help prompt as a function of an updated dialog state of the automated dialog system.

10. The method of claim 1, wherein the help request comprises a task specific request, the method further comprising:
identifying task specific information of a dialog task corresponding to the task specific request; and
identifying, for outputting in the natural language help prompt, a natural language sample corresponding to the identified task specific information.

11. A method comprising:
receiving, by a computing device, a first user help request for information about one or more capabilities of an automated dialog system;
identifying, based on a first state of the automated dialog system, first information corresponding to the one or more capabilities;
generating, by the computing device, a first help prompt comprising instructions for entering the first information, wherein the first help prompt includes information from data available to the automated dialog system; and
responsive to receiving a second user help request after the first information has been received by the automated dialog system:
generating, by the computing device and responsive to a determination that the automated dialog system is in a second state, a second help prompt that is different from the first help prompt, wherein the second help prompt comprises a natural language phrase based on the second state.

12. The method of claim 11, wherein the second help prompt comprises instructions for entering second information, wherein the second information comprises information expected to be input for the automated dialog system to perform the one or more capabilities.

13. The method of claim 12, wherein the second help prompt incorporates the first information to identify the second information, and wherein the second information comprises information that the automated dialog system has not yet received.

14. The method of claim 12, wherein the natural language phrase comprises instructions for a user to enter the second information.

15. A method comprising:
receiving, by a computing device, a first user help request for information about one or more capabilities of an automated dialog system;
identifying, based on a first state of the automated dialog system, first information for the automated dialog system to perform the one or more capabilities;
generating, by the computing device, a first help prompt comprising instructions for entering the first information; and
responsive to receiving a second user help request after the first information has been received by the automated dialog system:
determining that the automated dialog system has entered a second state;
identifying, based on a mapping between states of the automated dialog system and information expected by the automated dialog system, second information for the automated dialog system to perform the one or more capabilities; and
generating, by the computing device, a second help prompt that is different from the first help prompt, wherein the second help prompt comprises instructions for entering the second information.

16. The method of claim 15, wherein the identifying the second information comprises identifying the second information in response to determining that the automated dialog system has entered, between a time when the first user help request was received and a time when the second user help request was received, the second state.

17. The method of claim 15, wherein the identifying the second information comprises identifying the second information based on the first information.

18. The method of claim 15, wherein the identifying the second information comprises:
determining information corresponding to the second state and expected by the automated dialog system.

* * * * *